(12) United States Patent
Hill et al.

(10) Patent No.: US 6,884,092 B2
(45) Date of Patent: Apr. 26, 2005

(54) ELECTRODE FOR USE IN AN ELECTROCHEMICAL TREATMENT PROCESS

(75) Inventors: Andrew Hill, Bramcote (GB); John Michael Hill, Sheffield (GB); Thomas John Partington, Leeds (GB)

(73) Assignee: Atraverda Limited (GB)

( * ) Notice: Subject to any disclaimer, the term of this patent is extended or adjusted under 35 U.S.C. 154(b) by 74 days.

(21) Appl. No.: 10/275,804

(22) PCT Filed: Mar. 5, 2001

(86) PCT No.: PCT/GB01/00941

§ 371 (c)(1),
(2), (4) Date: Nov. 8, 2002

(87) PCT Pub. No.: WO01/66828

PCT Pub. Date: Sep. 13, 2001

(65) Prior Publication Data

US 2003/0119377 A1 Jun. 26, 2003

(51) Int. Cl.[7] ................................................. H01R 4/58
(52) U.S. Cl. ........................ 439/86; 439/931; 439/909; 439/700
(58) Field of Search .......................... 439/86, 931, 482, 439/219, 909, 935, 276, 700, 824, 244, 728, 729, 936

(56) References Cited

U.S. PATENT DOCUMENTS

| 2,863,819 | A |   | 12/1958 | Preiser |         |
|-----------|---|---|---------|---------|---------|
| 4,033,849 | A |   |  7/1977 | Pohto et al. |    |
| 4,154,667 | A |   |  5/1979 | Pohto et al. |    |
| 4,822,473 | A |   |  4/1989 | Arnesen |         |
| 4,966,675 | A |   | 10/1990 | Steininger |      |
| 5,074,809 | A | * | 12/1991 | Rousseau | 439/675 |
| 5,175,493 | A | * | 12/1992 | Langgard | 439/482 |
| 5,196,789 | A | * |  3/1993 | Golden et al. | 439/482 |
| 5,584,975 | A |   | 12/1996 | Pohto et al. |    |
| 5,746,616 | A | * |  5/1998 | Mar | 439/245 |

FOREIGN PATENT DOCUMENTS

| EP | 0 224 851 A1 |   | 6/1987 |
| EP | 2 309 978 A  |   | 8/1997 |
| EP | 0 883 700    |   | 8/1999 |
| JP | 3-272574     | * | 12/1991 |

OTHER PUBLICATIONS

Patent Act 1977 Search Report under Section 17.

* cited by examiner

*Primary Examiner*—Tho D. Ta
(74) *Attorney, Agent, or Firm*—Caesar, Rivise, Berstein, Cohen & Pokotilow, Ltd.

(57) ABSTRACT

An electrode comprises an outer tube containing a spiral inner electrode which surrounds a rod held at its ends by fittings in the ends of the tube.

14 Claims, 2 Drawing Sheets

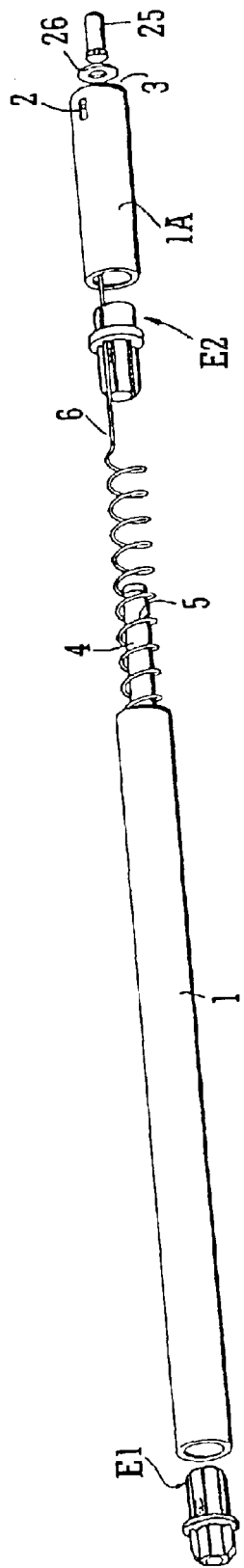
FIG. 1
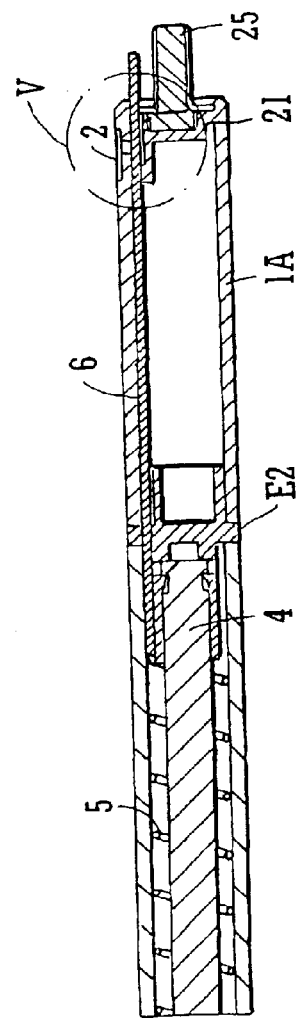
FIG. 2
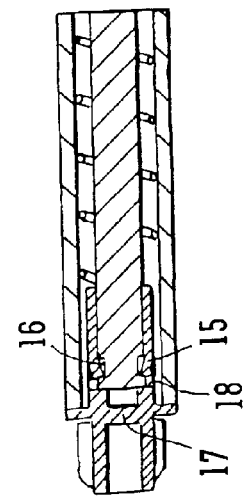

ELECTRODE FOR USE IN AN ELECTROCHEMICAL TREATMENT PROCESS

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISK

Not Applicable

BACKGROUND OF THE INVENTION

The invention relates to an electrode.

In our EP-0883700B we have described and claimed an electrode for use in electrochemical treatment of metal reinforced concrete, the electrode comprising a generally cylindrical body formed of porous material, the body having an external surface and an internal surface, a power supply conductor in use, being in electrical contact with the internal surface and with a supply of electrical current. The body wall is porous to allow ingress of gas and is preferably formed of a titanium suboxide of the formula $TiO_x$ where is 1.55 to 1.95.

When electrode bodies are required to be supported at their extreme ends, in electrochemical cells, rather than being encased in concrete, it is often necessary to provide specially shaped end caps. If these are simply attached with adhesives, the adhesives often fail in the extremely aggressive electrochemical environment. If mechanical means of attachment is used, then the electrode material itself is subject to mechanical forces, which may damage the body if the material is brittle, since the wall of the body will not withstand high compressive and torsional forces when end caps are inserted. Such strains arise for example when too much force is used to tighten up nuts and can cause the body to fracture.

It is one object of the invention to provide an electrode having a generally tubular body and end fittings which are easy to assemble and fix in place without any major mechanical stresses being applied to the body. It is another object of the invention to provide such an electrode in which the end fittings tend to align an elongate support for the internal electrode.

BRIEF SUMMARY OF THE INVENTION

According to the invention in one aspect there is provided an electrode comprising a generally tubular body having an external surface and an internal surface, an elongate rod extending between the ends of the body and having at least one end fitting at an end of the body, a power supply conductor being present in the annulus between the rod and the inner surface and in contact with that inner surface, and in use, in connection with a power supply.

Preferably an end fitting in the form of a cap is present at one or both ends of the tubular body to close one or both ends, the or each cap having an inner end portion shaped to hold and contribute to the centralisation of the cap and engage the inner surface of the end portion of the body without stressing the body. Most preferably the engaging means of the inner portions comprises radially spaced apart flexible flutes or vanes. Most preferably the flutes or vanes are at an angle to the true radial direction such that once compressed the flutes or vanes will be bent in the same radial direction to farther assist the centralisation. Most preferably the flutes or vanes are sufficiently tough and flexible to provide an element of flexibility in the axis of the end cap with respect to the axis of the tubular body, thus reducing bending stresses on the body, and also allowing the use of bodies with slightly variable internal diametric tolerances.

It is also preferred that the inner end portions of the caps each define a socket to receive an end portion of the rod to space the two end caps at an appropriate distance to ensure that axial compressive forces are transmitted along the rod rather than along the body. Preferably, the ends of the rods are provided with a clip system in each socket so that once engaged the rod cannot be withdrawn. In this way any axial extensional forces will tend to be are borne by the rod instead of the cylindrical body.

Preferably, all the components of the fittings can be manufactured by injection moulding of thermoplastic polymers which is a cheap high volume method, and thus results in cost effective electrodes.

The body may be formed of an electrically conductive ceramic material which will tend to be brittle. The body may be inherently electrically conductive or it may be covered with a coating of such a material.

The tubular body may be of a suitable shape, e.g. generally cylindrical or prismatic.

An electrode of the invention is very versatile and may be used as an anode or a cathode in many electrochemical reactions such as:

electrochemical water sterilisation;

electrochemical destruction of organics compounds such as pesticides and or pseudo-oestrogenic compounds in water;

electrochemical treatment of sewage;

electrochemical synthesis of fine chemicals; and electrochlorination of water for, for instance, swimming pools.

BRIEF DESCRIPTION OF THE SEVERAL VIEWS OF THE DRAWINGS

In order that the invention may be well understood it will now be described by way of example only with reference to the accompanying diagrammatic drawings, in which:

FIG. 1 is an exploded perspective view of one anode assembly of the invention;

FIG. 2 is a longitudinal sectional view of the anode of FIG. 1;

DETAILED DESCRIPTION OF THE INVENTION

Figure 3A:
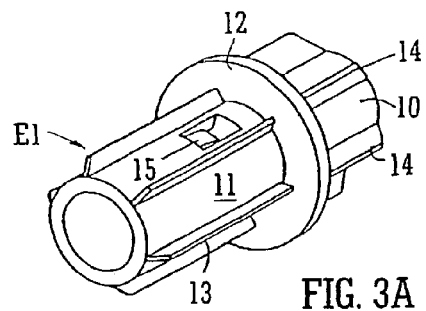
FIG. 3A is a perspective view of one end cap and FIG. 3B is an end view thereof.

The anode assembly includes two elongate tubes 1, 1A arranged end to end. The tube 1 is made of titanium suboxide available under the registered trade mark EBONEX. The tube 1A is moulded of a plastics. The wall of the tube 1 is solid along its length, whereas the tube 1A is solid save for a slot 2 at one end 3. The tube 1 contains an elongate support rod 4 which holds two caps E1, E2 in place, as will be explained below. A conductor wire 5 formed of titanium spring metal is present as a spiral about the rod 4 and has a straight tail 6 which emerges from the tube 1A at the end 3. This will be explained in better detail below.

Figure 3B:
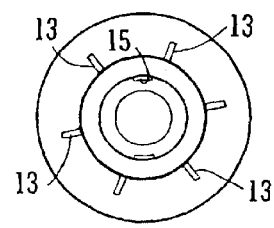
Figure 4:
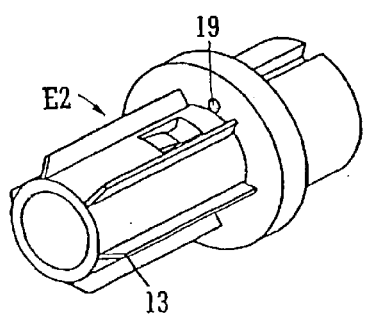
FIG. 4 is a perspective view of an extension cap.
Figure 5:
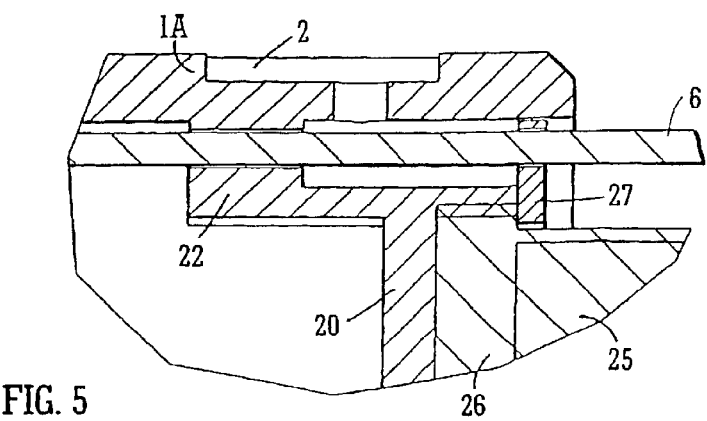
FIG. 5 is an enlarged view of the area on FIG. 2 marked 'V' and showing the end of the anode from which a wire emerges.

As shown in FIGS. 3A and 3B, the cap E1 consists of a cylinder having two longitudinal end portions 10, 11, separated by a shoulder 12. End portion 10 is shorter than the end portion 11. Six vanes are shown, but the number is not critical. The vanes are arranged so that they will flex in the same direction. The end portion 11 has inwardly turned reverse facing longitudinal spring tongues 15 located to be snap-engaged in slots 16 near the ends of the rod 4. An inner partition 17 is present to separate the two end portions and an inner shoulder 18 is present in the end portion 11, to act as an abutment for the end of the rod 4 so that the tongues 15 will align with the slots 16. The cap E1 is received in and engages in one end of the tube 1.

The second end cap E2, has the same vane or fluting as E1, but differs in the presence of hole 19, whereby the electrical connection wire passes through E2. The end portion 10 of E2 is illustrated to be as interference fit with tube 1A. (This joint however could be made with an adhesive or with a friction or other welding technique). Tube 1A is present in this illustration to provide a smooth seal surface to allow the electrode to pass through the wall of the electrochemical cell, and so that the electrical connection from the power supply is outside the cell and easy to access.

The wire 6 passes through the end of tube 1A through a hole, which is provided with a sealing system, such as is illustrated. Sealant can be injected into hole 2 and fill the annulus around the wire preventing any leakage of electrolyte through the end of tube 1A.

The electrical connection can be made directly to the exposed end of wire 6, but in this example, the tube 1A is provided with a short threaded stud 25, around which can be bent the end of the wire 5, supported by washer 27, to present a neat terminal for the electrical connection.

Typically the electrode is assembled by inserting the straight part 6 of wire 5 through hole 19 in E2 and then pressing tube 1A into place on E2 with wire 5 extending through the tube 1. Rod 4 is then placed into the socket in E2 and engaged with the clip. An assembly tool, not shown, is then used to "wind up" the spring part of wire 5, thus reducing its diameter such that the body 1 can be slid over it and onto the flutes of E2 probably with a slight rotation. Because the vanes flex in the same direction, they will tend to bend and reduce the overall diameter of the cap and act as a self-centring system. The spring is then released and allowed to engage on the internal surface of tube 1. E1 is then pressed into place, also with a slight rotational movement until it is captured by the clip engaging into rod 4, also with the flutes acting as a self-centring system similar to E2. Washer 26 is added and the wire bent around stud 25. Finally sealant is injected into slot 2.

The flutes can also accommodate tubes of different diameters, as well as some flexibility to eliminate bending stresses.

The support rod is positively engaged at both ends, which capture the rod and eliminates both compressive and extensive forces on the ceramic tube.

Because all the parts lock together mechanically, there is no need for adhesives.

SEQUENCE LISTING

Not Applicable

What is claimed is:

1. An electrode for use in an electrochemical treatment process, the electrode comprising:
    (i) an elongate generally tubular electrode body made of relatively brittle material, said body having an interior having an inner surface and an axis extending through the interior of the electrode body;
    (ii) an elongate support member parallel to said axis within said interior of the electrode body;
    (iii) spacer means coupled between the elongate support member and the electrode body for locating radial and axial positions of the electrode body relative to the elongate support member, the spacer means comprising resilient portions engaged with the electrode body for resiliently maintaining radial spacing between the electrode body and the elongate member;
    (iv) electrical conductor means in the interior of the electrode body for making electrical contact with the inner surface of the electrode body at a plurality of positions spaced along said axis.

2. An electrode according to claim 1, wherein said spacer means comprises two spacer members positioned at respective ends of the electrode body and each spacer means comprising the resilient portions engaged with the electrode body.

3. An electrode according to claim 1, wherein said resilient portions comprise a plurality of flutes extending radially outwardly into engagement with the inner surface of the electrode body.

4. An electrode according to claim 1, wherein said resilient portions comprise a plurality of flexible vanes extending radially outwardly into engagement with the inner surface of the electrode body.

5. An electrode according to claim 1, wherein said spacer means is connected to the elongate support member by a spring tongue means fixed to the spacer means and operable to snap engage apertures formed in the elongate support member.

6. An electrode according to claim 1, wherein said spacer means comprises two caps at respective ends of the electrode body and operable to close the electrode body at said ends.

7. An electrode according to claim 1, wherein said spacer means includes an end fitting comprising a tubular portion having a plurality of radially outwardly extending flexible vanes and a shoulder portion adjacent the tubular portion for engaging the inner surface and an end of the electrode body, said end fitting comprising electrode mounting means in the form of another tubular portion extending axially from the shoulder away from the first-mentioned tubular portion and having a plurality of radially outwardly extending flexible vanes.

8. An electrode according to claim 1, wherein the electrical conductor means is a coiled spring for being wound up to enable it to be entered into said electrode body and then released so that its coils unwind and expand into electrical contact with the inner surface of the electrode body.

9. An electrode according to claim 1, wherein said electrode body is made of electrically conductive ceramic material.

10. An electrode according to claim 1, wherein said electrode body is made of ceramic material having a coating of electrically conductive material thereon.

11. An electrode according to claim 1, wherein said electrode body is made of titanium suboxide.

12. An electrode for use in an electrochemical treatment process, the electrode comprising:

(i) an elongate generally tubular electrode body having a longitudinal axis and an inner surface and made of relatively brittle electrically conductive ceramic material;

(ii) two end fittings made of plastics material and having respective plug portions extending into respective ends of the tubular electrode body arid having respective shoulder portions in axial engagement with the ends of the electrode body;

(iii) an elongate support rod extending through the electrode body and coupled to said two end fittings;

(iv) locating means at respective ends of the elongate support rod and operable to fix axial positions of the end fittings relative to the elongate support rod and avoid stress applied axially to the electrode body;

(v) resilient support means connected between said plug portions and the inner surface of the tubular electrode body for supporting the electrode body radially and maintaining radial spacing between the end fittings and the electrode body while avoiding radial stress on the electrode body;

(vi) an elongate electrically conductive member coiled around the elongate support rod between the elongate support rod and the electrode body and in electrical contact with the inner surface of the electrode body at a plurality of positions along said axis.

13. An electrode according to claim 12, wherein the end fittings comprise respective mounting portions extending from the shoulder portions in respective directions away from the electrode body, each mounting portion having radially outwardly extending vanes.

14. An electrode according to claim 13, including a tubular extrusion portion engaged over the vanes of the mounting portion at one end, said electrically conductive member being connected to an electrical supply tail that leads from inside the electrode body to the outside of the electrode through the end fitting at said one end of the electrode and through said tubular extension portion.

* * * * *